(12) United States Patent
Kim et al.

(10) Patent No.: US 8,533,554 B2
(45) Date of Patent: Sep. 10, 2013

(54) METHOD AND APPARATUS FOR IMPLEMENTING A HARQ IN A MULTI-CARRIER SYSTEM

(75) Inventors: So Yeon Kim, Anyang-si (KR); Jae Hoon Chung, Anyang-si (KR); Yeong Hyeon Kwon, Anyang-si (KR); Seung Hee Han, Anyang-si (KR)

(73) Assignee: LG Electronics Inc., Seoul (KR)

( * ) Notice: Subject to any disclaimer, the term of this patent is extended or adjusted under 35 U.S.C. 154(b) by 54 days.

(21) Appl. No.: 13/265,329

(22) PCT Filed: Apr. 23, 2010

(86) PCT No.: PCT/KR2010/002582
§ 371 (c)(1),
(2), (4) Date: Oct. 19, 2011

(87) PCT Pub. No.: WO2010/123323
PCT Pub. Date: Oct. 28, 2010

(65) Prior Publication Data

US 2012/0042221 A1 Feb. 16, 2012

Related U.S. Application Data

(60) Provisional application No. 61/172,206, filed on Apr. 23, 2009.

(30) Foreign Application Priority Data

Apr. 23, 2010 (KR) .................. 10-2010-0037791

(51) Int. Cl.
*H04L 1/18* (2006.01)

(52) U.S. Cl.
USPC .......................................... 714/749

(58) Field of Classification Search
USPC .......................................... 714/749
See application file for complete search history.

(56) References Cited

U.S. PATENT DOCUMENTS

| 8,281,201 B2 * | 10/2012 | Kim et al. ............... 714/748 |
| 2009/0300456 A1* | 12/2009 | Pelletier et al. ............ 714/749 |
| 2011/0176443 A1* | 7/2011 | Astely et al. ............ 370/252 |

FOREIGN PATENT DOCUMENTS

| KR | 10-2006-0073991 | 6/2006 |
| KR | 10-0606099 | 7/2006 |

OTHER PUBLICATIONS

CMCC (Email discussion rapporteur), "Report of email discussion [64b: 13] on HARQ RTT Timer for ACK/NACK repetition in TDD DRX," R2-091419, 3GPP TSG-RAN WG2#65, Feb. 2009.

* cited by examiner

*Primary Examiner* — Albert Decady
*Assistant Examiner* — Enam Ahmed
(74) *Attorney, Agent, or Firm* — Lee, Hong, Degerman, Kang & Waimey (57) ABSTRACT

Provided are a method and apparatus for implementing a hybrid automatic repeat request (HARQ). A terminal receives a plurality of transmission blocks through a plurality of downlink component carrier waves, and determines a plurality of ACK/NACK resources for the plurality of transmission blocks. If the plurality of ACK/NACK resources overlaps, the terminal uses the overlapping ACK/NACK resources to transmit one bundled ACK/NACK signal for the plurality of transmission blocks through an uplink component carrier wave.

12 Claims, 11 Drawing Sheets

METHOD AND APPARATUS FOR IMPLEMENTING A HARQ IN A MULTI-CARRIER SYSTEM

CROSS-REFERENCE TO RELATED APPLICATIONS

This application is the National Stage filing under 35 U.S.C. 371 of International Application No. PCT/KR2010/002582, filed on Apr. 23, 2010, which claims the benefit of earlier filing date and right of priority to Korean Application Serial No. 10-2010-0037791, filed on Apr. 23, 2010, and also claims the benefit of U.S. Provisional Application Ser. No. 61/172,206, filed on Apr. 23, 2009, the contents of which are all incorporated by reference herein in their entirety.

TECHNICAL FIELD

The present invention relates to wireless communications, and more particularly, to an apparatus and method for performing a hybrid automatic repeat request (HARQ) in a multi-carrier system.

BACKGROUND ART

A hybrid automatic repeat request (HARQ) scheme is a combination of a forward error correction (FEC) scheme and an automatic repeat request (ARQ) scheme. In the HARQ scheme, it is determined whether an unrecoverable error is included in data received by a physical layer, and retransmission is requested upon detecting the error, thereby improving performance.

If the error is not detected from the received data, a receiver transmits a positive-acknowledgement (ACK) signal as a reception acknowledgement to report to a transmitter that reception is successful. If the error is detected from the received data, the receiver transmits a negative-acknowledgement (NACK) signal as the reception acknowledgement to report to the transmitter that the error is detected. The transmitter can retransmit the data upon receiving the NACK signal. The ACK signal or the NACK signal is called an ACK/NACK signal.

In a typical wireless communication system, only one carrier is considered even if a bandwidth between an uplink and a downlink is configured differently from each other. The carrier is defined with a center frequency and a bandwidth. A multiple carrier system uses a plurality of component carriers having a smaller bandwidth than a full bandwidth.

The multiple carrier system can support backward compatibility with respect to legacy systems, and significantly increases a data rate by using multiple carriers.

In order to perform HARQ in the multi-carrier system, it is necessary to consider transmission of an ACK/NACK signal. A plurality of transport blocks can be transmitted through multiple carriers. Resources for transmitting respective ACK/NACK signals for all of the plurality of transport blocks may not be fully ensured.

SUMMARY OF INVENTION

Technical Problem

The present invention provides a method and apparatus for performing hybrid automatic repeat request (HARQ) in a multi-carrier system.

The present invention also provides a method and apparatus for transmitting reception acknowledgement in a wireless communication system.

Technical Solution

In an aspect, a method for performing a hybrid automatic repeat request (HARQ) in a multi-carrier system, performed by a user equipment, is provided. The method includes receiving a plurality of transport blocks through a plurality of downlink component carriers, determining a plurality of positive-acknowledgement (ACK)/negative-acknowledgement (NACK) resources for the plurality of transport blocks, and if the plurality of ACK/NACK resources overlap, transmitting one bundled ACK/NACK signal for the plurality of transport blocks through an uplink component carrier by using the overlapping ACK/NACK resources.

The plurality of transport blocks may be received on a physical downlink shared channel (PDSCH) respectively through the plurality of downlink component carriers, and each PDSCH may be indicated by resource allocation on a physical downlink control channel (PDCCH).

The plurality of ACK/NACK resources may be identified by a plurality of resource indices, and the plurality of resource indices may be used for transmission of respective PDCCHs.

If the plurality of resource indices are the same, the plurality of ACK/NACK resources may overlap.

A resource index $n^{(1)}_{PUUCH}$ may be defined as $n_{CCE} + N^{(1)}_{PUUCH}$, where $n_{CCE}$ is an index of a first control channel element (CCE) of a corresponding PDCCH and $N^{(1)}_{PUUCH}$ may be a parameter value reported by a base station to the user equipment via a higher layer message.

The same $n_{CCE}$ may be used in transmission of respective PDCCHs and thus the plurality of resource indices may be the same.

The same parameter value $N^{(1)}_{PUUCH}$ may be used for the plurality of downlink component carriers and thus the plurality of resource indices may be the same.

Each of the plurality of ACK/NACK resources may be defined by an orthogonal sequence index, a cyclic shift index, and a resource block index.

The bundled ACK/NACK signal may be an ACK signal if the plurality of transport blocks are all successfully received, and may be a NACK signal if one or more of the plurality of transport blocks are unsuccessfully received.

In another aspect, a receiver for performing a hybrid automatic repeat request (HARQ) is provided. The receiver includes a receiving unit for receiving a plurality of transport blocks through a plurality of downlink component carriers, and a transmitting unit for transmitting one bundled ACK/NACK signal for the plurality of transport blocks through an uplink component carrier by using overlapping ACK/NACK resources if the plurality of ACK/NACK resources for the plurality of transport blocks overlap.

Advantageous Effects

According to the present invention, a bundle positive-acknowledgement (ACK)/negative-acknowledgement (NACK) signal can be transmitted for a plurality of transport blocks without additional signaling.

MODE FOR INVENTION

A user equipment (UE) may be fixed or mobile, and may be referred to as another terminology, such as a mobile station (MS), a user terminal (UT), a subscriber station (SS), a wireless device, a personal digital assistant (PDA), a wireless modem, a handheld device, etc.

A base station (BS) is generally a fixed station that communicates with the UE and may be referred to as another terminology, such as an evolved node-B (eNB), a base transceiver system (BTS), an access point, etc.

Each BS provides a communication service to a specific geographical region (generally referred to as a cell). The cell can be divided into a plurality of regions (referred to as sectors).

Hereinafter, a downlink (DL) denotes a communication link from the BS to the UE, and an uplink (UL) denotes a communication link from the UE to the BS. In the DL, a transmitter may be a part of the BS, and a receiver may be a part of the UE. In the UL, the transmitter may be a part of the UE, and the receiver may be a part of the BS.

Figure 1:
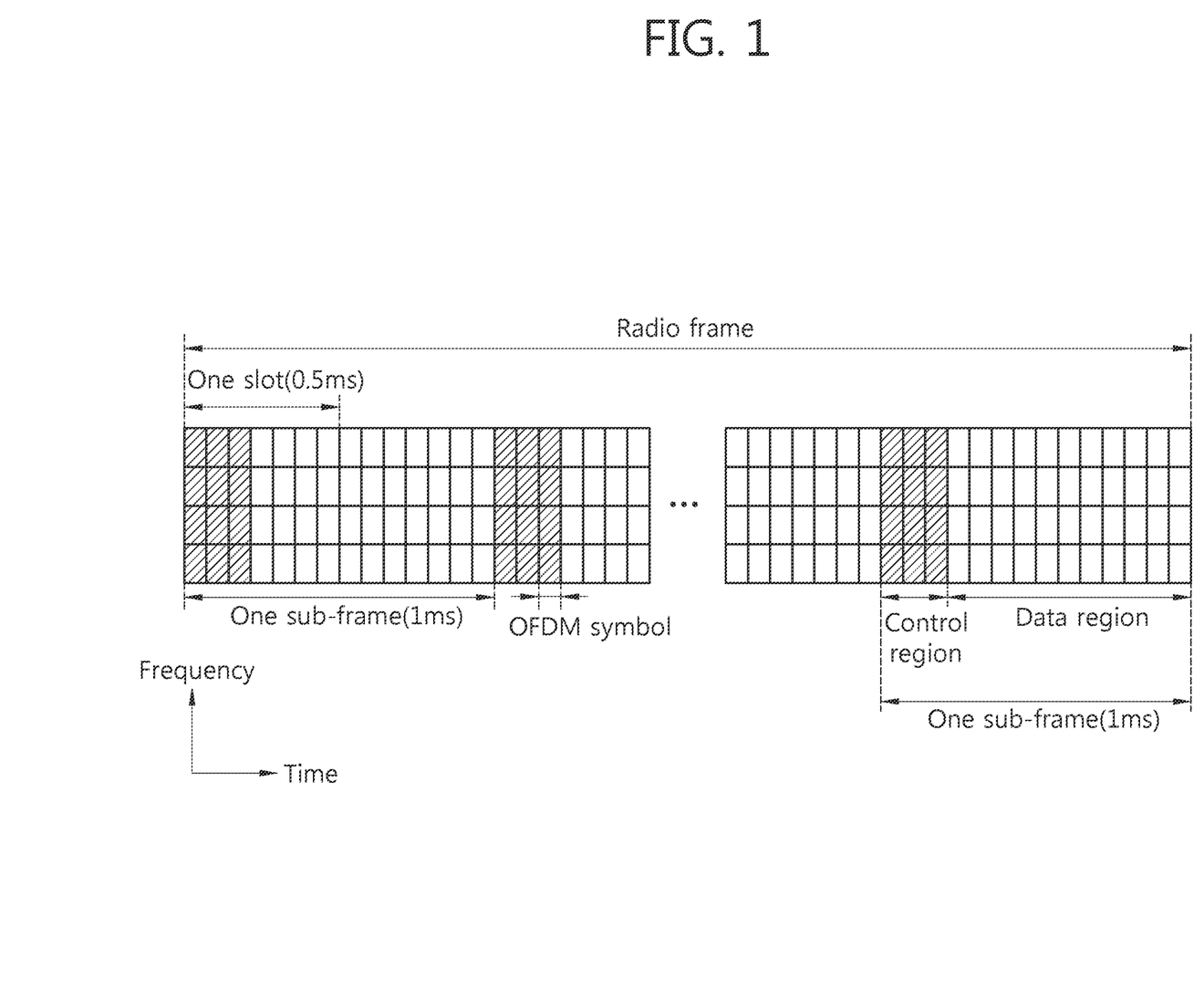
FIG. 1 shows a downlink (DL) radio frame structure in 3$^{rd}$ generation partnership project (3GPP) long term evolution (LTE).

FIG. 1 shows a DL radio frame structure in 3$^{rd}$ generation partnership project (3GPP) long term evolution (LTE). The section 6 of 3GPP TS 36.211 V8.5.0 (2008-December) "Evolved Universal Terrestrial Radio Access (E-UTRA); Physical Channels and Modulation (Release 8)" may be incorporated herein by reference. A radio frame consists of 10 subframes indexed with 0 to 9. One subframe consists of 2 slots. A time required for transmitting one subframe is defined as a transmission time interval (TTI). For example, one subframe may have a length of 1 millisecond (ms), and one slot may have a length of 0.5 ms.

One slot may include a plurality of orthogonal frequency division multiplexing (OFDM) symbols in a time domain. Since the 3GPP LTE uses orthogonal frequency division multiple access (OFDMA) in a downlink, the OFDM symbol is only for expressing one symbol period in the time domain, and there is no limitation in a multiple access scheme or terminologies. For example, the OFDM symbol may also be referred to as another terminology such as a single carrier frequency division multiple access (SC-FDMA) symbol, a symbol period, etc.

Although it is described that one slot includes 7 OFDM symbols for example, the number of OFDM symbols included in one slot may vary depending on a length of a cyclic prefix (CP). According to 3GPP TS 36.211 V8.5.0 (2008-December), in case of a normal CP, one subframe includes 7 OFDM symbols, and in case of an extended CP, one subframe includes 6 OFDM symbols.

A resource block (RB) is a resource allocation unit, and includes a plurality of subcarriers in one slot. For example, if one slot includes 7 OFDM symbols in a time domain and an RB includes 12 subcarriers in a frequency domain, one RB can include 7×12 resource elements (REs).

A subframe is divided into a control region and a data region in the time domain. The control region includes up to three preceding OFDM symbols of a 1$^{st}$ slot in the subframe. The number of OFDM symbols included in the control region may vary. A physical downlink control channel (PDCCH) is allocated to the control region, and a physical downlink shared channel (PDSCH) is allocated to the data region.

As disclosed in 3GPP TS 36.211 V8.5.0 (2008-December), the LTE classifies a physical channel into a data channel, i.e., a physical downlink shared channel (PDSCH) and a physical uplink shared channel (PUSCH), and a control channel, i.e., a physical downlink control channel (PDCCH), a physical control format indicator channel (PCFICH) and a physical hybrid-ARQ indicator channel (PHICH), and a physical uplink control channel (PUCCH).

The PCFICH transmitted in a 1$^{st}$ OFDM symbol in the subframe carries a control format indicator (CFI) regarding the number of OFDM symbols (i.e., a size of the control region) used for transmission of control channels in the subframe. A UE first receives the CFI on the PCFICH, and thereafter monitors the PDCCH.

The PHICH carries a positive-acknowledgement (ACK)/ negative-acknowledgement (NACK) signal for uplink hybrid automatic repeat request (HARQ). The ACK/NACK signal for UL data transmitted by the UE is transmitted on the PHICH.

Control information transmitted on the PDCCH is referred to as downlink control information (DCI). The DCI may include resource allocation of the PDSCH (this is referred to as a DL grant), resource allocation of a PUSCH (this is referred to as a UL grant), a set of transmit power control commands for individual UEs in any UE group and/or activation of a voice over Internet protocol (VoIP).

The DCI on the PDCCH is received by using blind decoding. A plurality of candidate PDCCHs can be transmitted in the control region of one subframe. The UE monitors the plurality of candidate PDCCHs in every subframe. Herein, monitoring is an operation in which the UE attempts decoding of each PDCCH according to a format of PDCCH to be monitored. The UE monitors a set of PDCCH candidates in a subframe to find its own PDCCH. For example, if there is no cyclic redundancy check (CRC) error detected by performing de-making on an identifier (i.e., cell-radio network temporary identifier (RNTI)) of the UE in a corresponding PDCCH, the UE detects this PDCCH as a PDCCH having a DCI of the UE.

The control region in the subframe includes a plurality of control channel elements (CCEs). The CCE is a logical allocation unit used to provide the PDCCH with a code rate depending on a wireless channel. The CCE corresponds to a plurality of resource element groups (REGs). According to a relation between the number of CCEs and the code rate provided by the CCEs, the PDCCH format and a possible number of bits of the PDCCH are determined.

In order to receive DL data, the UE first receives a DL resource allocation on the PDCCH. When PDCCH detection is successful, the UE reads the DCI on the PDCCH. By using the DL resource allocation in the DCI, DL data on the PDSCH is received. In addition, in order to transmit UL data, the UE first receives a UL resource allocation on the PDCCH. When PDCCH detection is successful, the UE reads the DCI on the PDCCH. By using the UL resource allocation in the DCI, UL data on the PUSCH is transmitted.

The 3GPP LTE uses synchronous HARQ in UL transmission, and uses asynchronous HARQ in DL transmission. In the synchronous HARQ, retransmission timing is fixed. In the asynchronous HARQ, the retransmission timing is not fixed. That is, in the synchronous HARQ, initial transmission and retransmission are performed with an HARQ interval.

Figure 2:
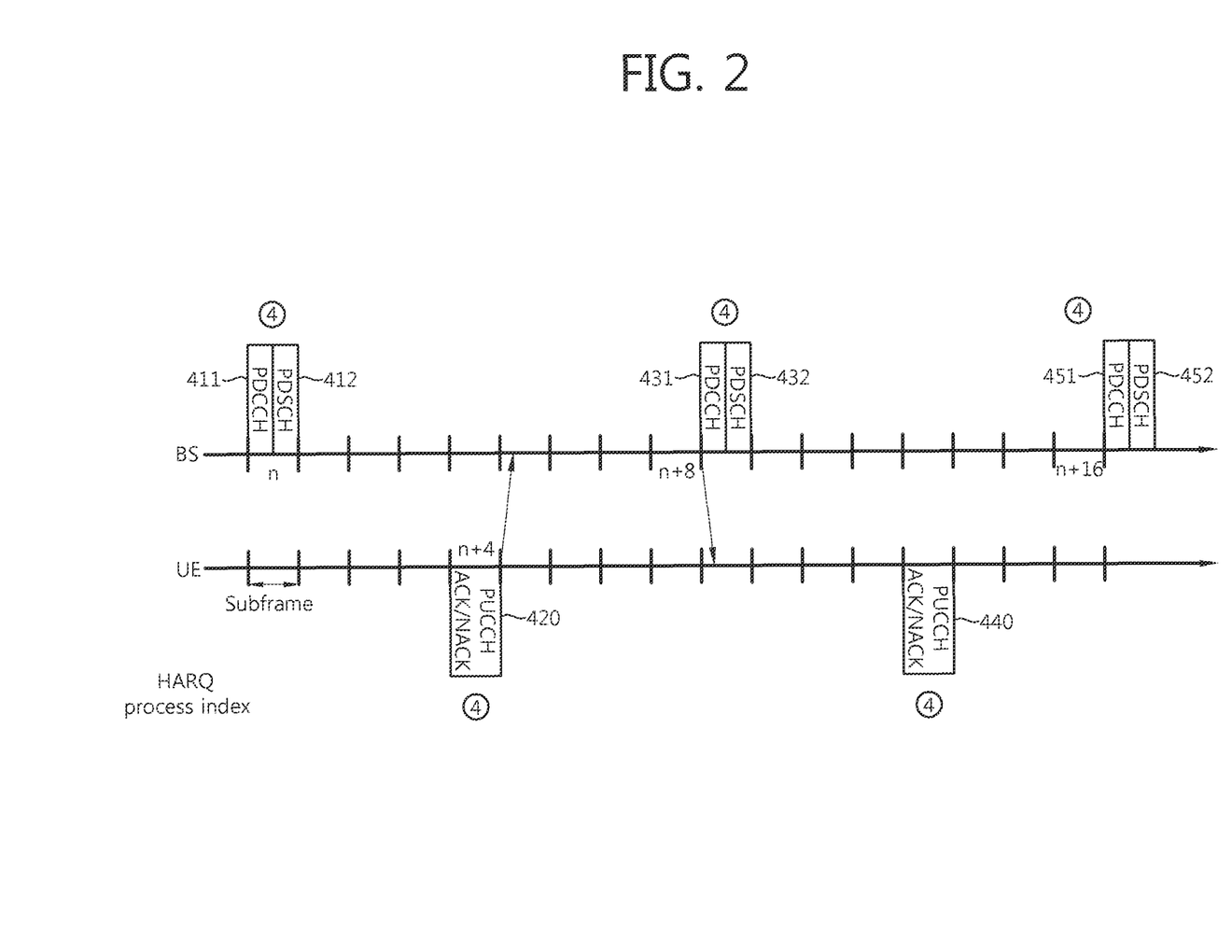
FIG. 2 shows DL asynchronous hybrid automatic repeat request (HARQ) in 3GPP LTE.

FIG. 2 shows DL asynchronous HARQ in 3GPP LTE.

A BS transmits a DL transport block to a UE on a PDSCH 412 indicated by DL resource allocation on a PDCCH 411 in an $n^{th}$ subframe.

The UE sends an ACK/NACK signal on a PUCCH 420 in an $(n+4)^{th}$ subframe. A resource of the PUCCH 420 used in transmission of the ACK/NACK signal is determined based on a resource of the PDCCH 411 (e.g., an index of a first CCE used in transmission of the PDCCH 411).

Even if the NACK signal is received from the UE, the BS does not necessarily perform retransmission in an $(n+8)^{th}$ subframe unlike in the UL HARQ. Herein, a retransmission block is transmitted on a PDSCH 432 indicated by DL resource allocation on a PDCCH 431 in an $(n+9)^{th}$ subframe.

The UE sends an ACK/NACK signal on a PUCCH 440 in an $(n+13)^{th}$ subframe.

According to asynchronous HARQ, the BS does not necessarily perform retransmission in a predetermined interval even if a retransmission request of the UE is received.

Now, transmission of an HARQ ACK/NACK signal on a PUCCH in 3GPP LTE will be described.

Figure 3:
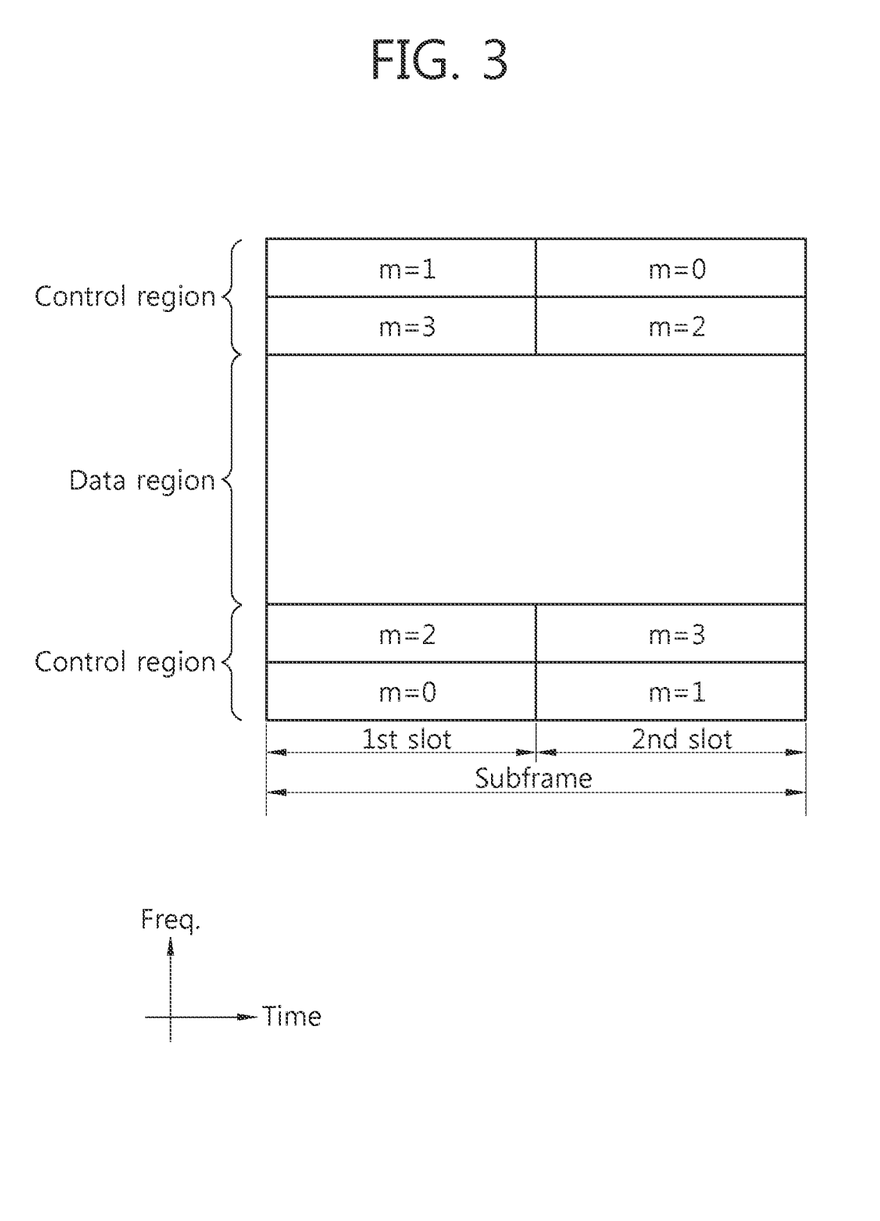
FIG. 3 shows an example of an uplink (UL) subframe in 3GPP LTE.

FIG. 3 shows an example of a UL subframe in 3GPP LTE.

A UL subframe can be divided into a control region to which a physical uplink control channel (PUCCH) for carrying UL control information is allocated and a data region to which a physical uplink shared channel (PUSCH) for carrying UL data is allocated. The PUCCH for one UE is allocated in an RB pair. RBs belonging to the RB pair occupy different subcarriers in each of a $1^{st}$ slot and a $2^{nd}$ slot. In FIG. 3, m is a location index indicating a logical frequency-domain location of the RB pair allocated to the PUCCH in the subframe. It shows that RBs having the same value m occupy different subcarriers in two slots.

According to 3GPP TS 36.211 V8.5.0 (2008-December), the PUCCH supports multiple formats. A PUCCH having a different number of bits per subframe can be used according to a modulation scheme depending on a PUCCH format. Table 1 below shows an example of a modulation scheme and the number of bits per subframe with respect to the PUCCH format.

TABLE 1

| PUCCH Format | Modulation Scheme | Number of Bits per subframe |
|---|---|---|
| 1 | N/A | N/A |
| 1a | BPSK | 1 |
| 1b | QPSK | 2 |
| 2 | QPSK | 20 |
| 2a | QPSK + BPSK | 21 |
| 2b | QPSK + BPSK | 22 |

The PUCCH format 1 is used for transmission of a scheduling request (SR). The PUCCH formats 1a/1b are used for transmission of an ACK/NACK signal. The PUCCH format 2 is used for transmission of a CQI. The PUCCH formats 2a/2b are used for simultaneous transmission of the CQI and the ACK/NACK signal. When only the ACK/NACK signal is transmitted in a subframe, the PUCCH formats 1a/1b are used. When the SR is transmitted alone, the PUCCH format 1 is used. When the SR and the ACK/NACK are simultaneously transmitted, the PUCCH format 1 is used, and in this transmission, the ACK/NACK signal is modulated by using a resource allocated to the SR.

All PUCCH formats use a cyclic shift (CS) of a sequence in each OFDM symbol. The cyclically shifted sequence is generated by cyclically shifting a base sequence by a specific CS amount. The specific CS amount is indicated by a CS index.

An example of a base sequence $r_u(n)$ is defined by Equation 1 below.

$$r_u(n) = e^{jb(n)\pi/4} \quad \text{[Equation 1]}$$

In Equation 1, u denotes a root index, and n denotes a component index in the range of $0 \leq n \leq N-1$, where N is a length of the base sequence. The length of the sequence is equal to the number of elements included in the sequence. u can be determined by a cell identifier (ID), a slot number in a radio frame, etc. When it is assumed that the base sequence is mapped to one RB in a frequency domain, the length N of the base sequence is 12 since one RB includes 12 subcarriers. A different base sequence is defined according to a different root index.

If N=12 and $u \in \{0, \ldots, 29\}$ in 3GPP TS 36.211 V8.4.0 (2008-September), b(n) is defined by Table 2 below.

TABLE 2

| u | b(0), ..., b(11) |
|---|---|
| 0 | −1 1 3 −3 3 3 1 1 3 1 −3 3 |
| 1 | 1 1 3 3 3 −1 1 −3 −3 1 −3 3 |
| 2 | 1 1 −3 −3 −3 −1 −3 −3 1 −3 1 −1 |
| 3 | −1 1 1 1 1 −1 −3 −3 1 −3 3 −1 |
| 4 | −1 3 1 −1 1 −1 −3 −1 1 −1 1 3 |
| 5 | 1 −3 3 −1 −1 1 1 −1 −1 3 −3 1 |
| 6 | −1 3 −3 −3 −3 3 1 −1 3 3 −3 1 |
| 7 | −3 −1 −1 −1 1 −3 3 −1 1 −3 3 1 |
| 8 | 1 −3 3 1 −1 −1 −1 1 1 3 −1 1 |
| 9 | 1 −3 −1 3 3 −1 −3 1 1 1 1 1 |
| 10 | −1 3 −1 1 1 −3 −3 −1 −3 3 −1 |
| 11 | 3 1 −1 −1 3 3 −3 1 3 1 3 3 |
| 12 | 1 −3 1 1 −3 1 1 1 −3 −3 −3 1 |
| 13 | 3 3 −3 3 −3 1 1 3 −1 −3 3 3 |
| 14 | −3 1 −1 −3 −1 3 1 3 3 3 −1 1 |
| 15 | 3 −1 1 −3 −1 −1 1 1 3 1 −1 −3 |
| 16 | 1 3 1 −1 1 3 3 3 −1 −1 3 −1 |
| 17 | −3 1 1 3 −3 3 −3 −3 3 1 3 −1 |
| 18 | −3 3 1 1 −3 1 −3 −3 −1 −1 1 −3 |
| 19 | −1 3 1 3 1 −1 −1 3 −3 −1 −3 −1 |
| 20 | −1 −3 1 1 1 1 3 1 −1 1 −3 −3 |
| 21 | −1 3 −1 1 −3 −3 −3 −3 −3 1 −1 −3 |
| 22 | 1 1 −3 −3 −3 −3 −1 3 −3 1 −3 3 |
| 23 | 1 1 −1 −3 −1 −3 1 −1 1 3 −1 1 |
| 24 | 1 1 3 1 3 3 −1 1 −1 −3 −3 1 |
| 25 | 1 −3 3 3 1 3 3 1 −3 −1 −1 3 |
| 26 | 1 3 −3 −3 3 −3 1 −1 −1 3 −1 −3 |
| 27 | −3 1− −3 −1 −3 3 1 −1 1 3 −3 −3 |
| 28 | −1 3 −3 3 −1 3 3 −3 3 3 −1 −1 |
| 29 | 3 −3 −3 −1 −1 −3 −1 3 −3 3 1 −1 |

The base sequence r(n) can be cyclically shifted by Equation 2 below to generate a cyclically shifted sequence $r(n, I_{CS})$.

$$r(n, I_{cs}) = r(n) \cdot \exp\left(\frac{j2\pi I_{cs} n}{N}\right), \quad 0 \leq I_{cs} \leq N-1 \quad \text{[Equation 2]}$$

In Equation 2, $I_{CS}$ denotes a CS index indicating a CS amount ($0 \leq I_{CS} \leq N-1$).

Hereinafter, the available CS of the base sequence denotes a CS that can be derived from the base sequence according to a CS unit. For example, if the base sequence has a length of 12 and the CS unit is 1, the total number of available CS indices of the base sequence is 12. Alternatively, if the base sequence has a length of 12 and the CS unit is 6, the total number of available CS indices of the base sequence is 6.

Figure 4:
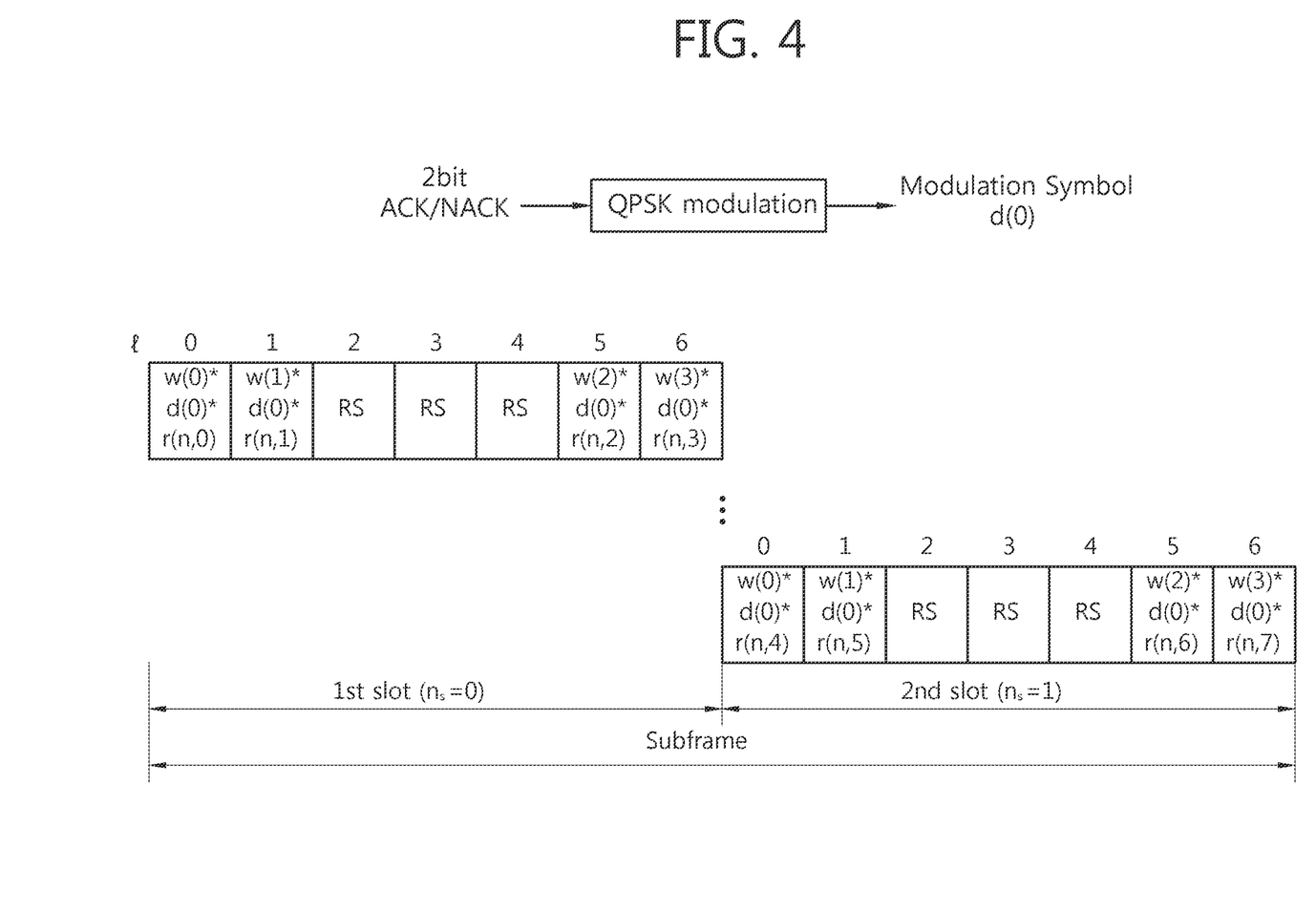
FIG. 4 shows a physical uplink control channel (PUCCH) format 1b in a normal cyclic prefix (CP) in 3GPP LTE.
Figure 5:
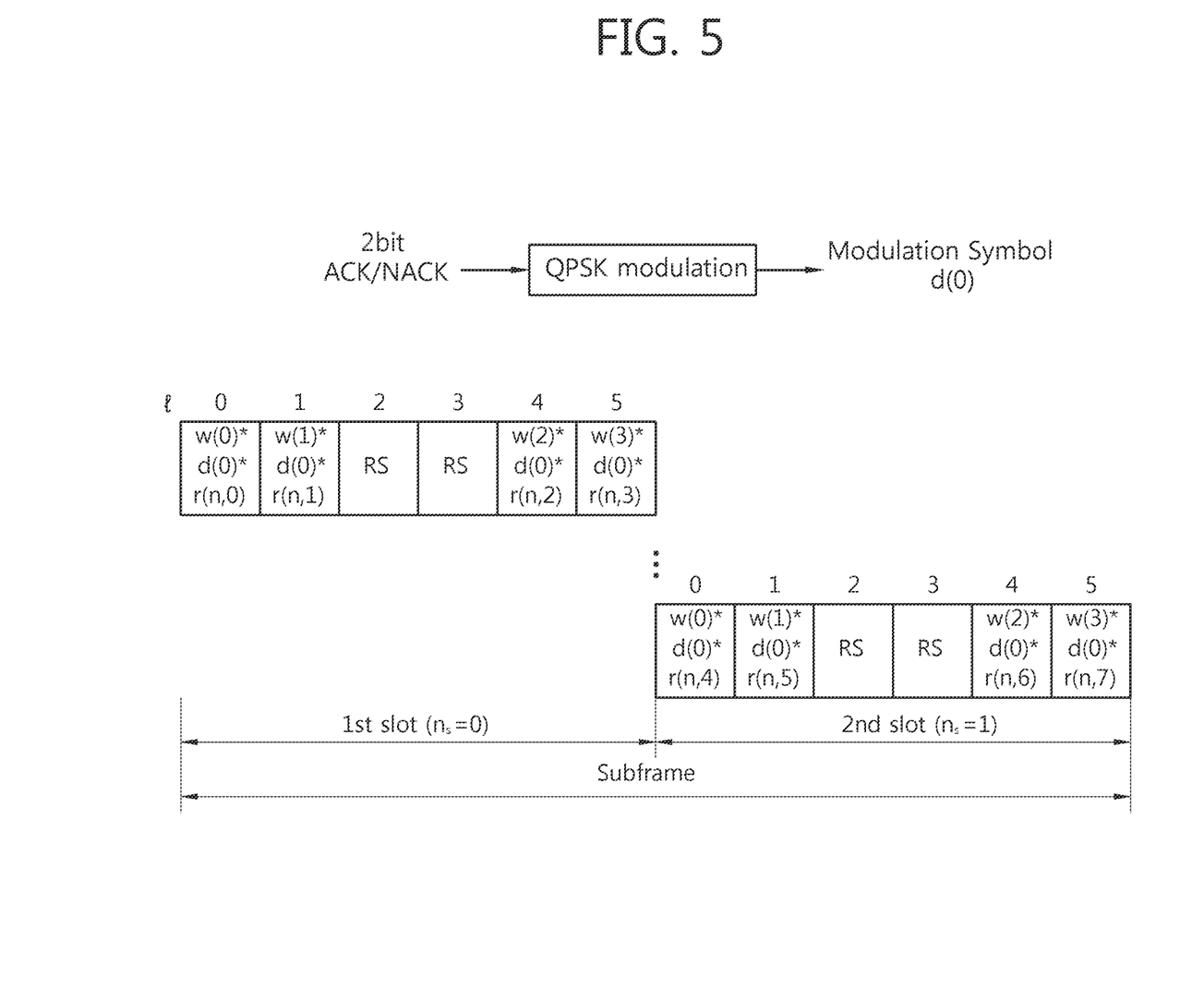
FIG. 5 shows a PUCCH format 1b in an extended CP in 3GPP LTE.

FIG. 4 shows a PUCCH format 1b in a normal CP in 3GPP LTE. FIG. 5 shows a PUCCH format 1b in an extended CP in 3GPP LTE. A location of a reference signal (RS) and the number of RSs are different between the normal CP and the extended CP since the number of OFDM symbols included in each slot are different, but ACK/NACK transmission is performed with the same structure between the normal CP and the extended CP.

A modulation symbol d(0) is generated by modulating a 1-bit ACK/NACK signal based on binary phase shift keying (BPSK) or by modulating a 2-bit ACK/NACK signal based on quadrature phase shift keying (QPSK). Table 3 below shows an example of constellation mapping of the 1-bit or 2-bit ACK/NACK signal.

TABLE 3

| PUCCH Format | ACK/NACK | d(0) |
|---|---|---|
| 1a | 0 | 1 |
|  | 1 | −1 |
| 1b | 00 | 1 |
|  | 01 | −j |
|  | 10 | j |
|  | 11 | −1 |

Since 5 OFDM symbols are present for transmission of the ACK/NACK signal in one slot in the normal CP or the extended CP, 10 OFDM symbols are present in total for transmission of the ACK/NACK signal in one subframe. The modulation symbol d(0) is spread to a cyclically shifted sequence $r(n, I_{CS})$. When a one-dimensionally spread sequence corresponding to an $(i+1)^{th}$ OFDM symbol is denoted by m(i), it can be expressed as follows.

$$\{m(0), m(1), \ldots, m(9)\} = \{d(0)r(n, I_{CS}), d(0)r(n, I_{CS}), \ldots, d(0)r(n, I_{CS})\}$$

In order to increase UE capacity, the one-dimensionally spread sequence can be spread by using an orthogonal sequence. An orthogonal sequence $w_i(k)$ (where i is a sequence index, $0 \leq k \leq K-1$) having a spread factor K=4 uses the following sequence.

TABLE 4

| Index (i) | [$w_i(0), w_i(1), w_i(2), w_i(3)$] |
|---|---|
| 0 | [+1, +1, +1, +1] |
| 1 | [+1, −1, +1, −1] |
| 2 | [+1, −1, −1, +1] |

An orthogonal sequence $w_i(k)$ (where i is a sequence index, $0 \leq k \leq K-1$) having a spread factor K=3 uses the following sequence.

TABLE 5

| Index (i) | [$w_i(0), w_i(1), w_i(2)$] |
|---|---|
| 0 | [+1, +1, +1] |
| 1 | [+1, $e^{j2\pi/3}$, $e^{j4\pi/3}$] |
| 2 | [+1, $e^{j4\pi/3}$, $e^{j2\pi/3}$] |

A different spread factor can be used for each slot. In 3GPP LTE, a last OFDM symbol in a subframe is used for transmission of a sounding reference signal (SRS). In this case, a PUCCH uses a spread factor K=4 for a $1^{st}$ slot and uses a spread factor K=3 of a $2^{nd}$ slot.

Therefore, when any orthogonal sequence index i is given, two-dimensionally spread sequences s(0), s(1), ..., s(9) can be expressed as follows.

$$\{s(0), s(1), \ldots, s(9)\} = \{w_i(0)m(0), w_i(1)m(1), w_i(2)m(2), w_i(3)m(3), w_i(4)m(4), w_i(0)m(5), w_i(1)m(7), w_i(2)m(8), w_i(3)m(9)\}$$

A CS index $I_{CS}$ can vary depending on a slot number $n_S$ in a radio frame and/or a symbol index l in a slot. When a $1^{st}$ CS index is set to 0 and a CS index value is increased by one in each OFDM symbol, as shown in FIG. 4 and FIG. 5, it can be expressed as follows.

$$\{s(0), s(1), \ldots, s(9)\} = \{w_i(0)d(0)r(n, 0), w_i(1)d(1)r(n, 1), \ldots, w_i(3)d(9)r(n, 9)\}$$

The two-dimensionally spread sequences $\{s(0), s(1), \ldots, s(9)\}$ are subjected to IFFT and thereafter are transmitted by using corresponding RBs. Accordingly, an ACK/NACK signal is transmitted on a PUCCH.

An orthogonal sequence index i, a CS index $I_{CS}$, and an RB index m are parameters required to configure the PUCCH, and are ACK/NACK resources (also called PUCCH resources) used to identify the PUCCH (or UE). If the number of available CS indices is 12 and the number of available orthogonal sequence indices is 3, PUCCHs for 36 UEs in total can be multiplexed to one RB.

An ACK/NACK resource defined with the three parameters for configuring the PUCCH is identified by a resource index $n^{(1)}_{PUCCH}$ in 3GPP LTE.

Figure 6:
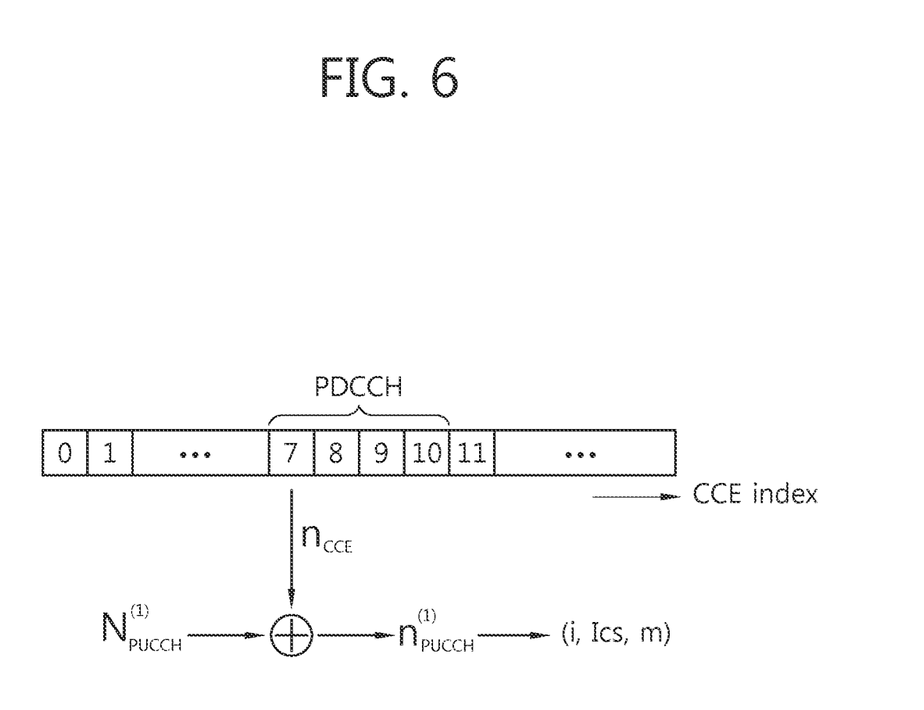
FIG. 6 shows a method of acquiring a resource for configuring a PUCCH.

FIG. 6 shows a method of acquiring a resource for configuring a PUCCH.

A resource index $n^{(1)}_{PUCCH}$ is defined to $n^{(1)}_{PUCCH} = n_{CCE} + N^{(1)}_{PUUCH}$, where $n_{CCE}$ is an index of a $1^{st}$ CCE of a PDCCH used for transmission of a corresponding DCI (i.e., a DL resource allocation used for reception of a DL transport block corresponding to an ACK/NACK signal), and $N^{(1)}_{PUUCH}$ is a value reported by a BS to a UE via a higher layer message.

It is assumed herein that a PDCCH of which DL allocation is detected uses 4 CCEs having CCE indices 7, 8, 9, and 10 in a control region. The index of the $1^{st}$ CCE of the PDCCH (or a lowest CCE index) is $n_{CCE}=7$. Since $N^{(1)}_{PUUCH}$ is a parameter given by the BS, the UE can determine the resource index $n^{(1)}_{PUUCH}$.

On the basis of the resource index $n^{(1)}_{PUUCH}$, the UE can determine the orthogonal sequence index i, the CS index $I_{CS}$, and the RB index m to configure the PUCCH.

As a result, it can be said that the ACK/NACK resource used for transmission of the PUCCH is implicitly determined depending on a resource of a corresponding PDCCH. This is because the BS does not separately report a resource used by the UE for transmission of the PUCCH for the ACK/NACK signal and indirectly reports it by using a resource of a PDCCH used for resource allocation of a DL transport block.

Now, a multi-carrier system will be described.

The 3GPP LTE system supports a case where a DL bandwidth and a UL bandwidth are set differently under the premise that one CC is used. This implies that the 3GPP LTE is supported only for a case where the DL bandwidth and the UL bandwidth are equal to or different from each other in a situation where one CC is defined for each of a DL and a UL. For example, the 3GPP LTE may support up to 20 MHz, and supports only one CC for the UL and the DL even if the UL bandwidth and the DL bandwidth may be different from each other.

Spectrum aggregation (also referred to as bandwidth aggregation or carrier aggregation) is for supporting a plurality of CCs. The spectrum aggregation is introduced to support an increasing throughput, to prevent cost rising caused by introduction of a broadband radio frequency (RF) device, and to ensure compatibility with a legacy system. For example, when 5 CCs are assigned with a granularity of a carrier unit having a bandwidth of 20 MHz, a bandwidth of up to 100 MHz can be supported.

The spectrum aggregation can be classified into contiguous spectrum aggregation achieved between consecutive carriers in a frequency domain and non-contiguous spectrum aggregation achieved between discontinuous carriers. The number of aggregated CCs may be set differently between the DL and the UL. Symmetric aggregation is achieved when the number of DL CCs is equal to the number of UL CCs. Asymmetric aggregation is achieved when the number of DL CCs is different from the number of UL CCs.

Hereinafter, a multi-carrier system implies a system supporting multiple carriers on the basis of spectrum aggregation. The multi-carrier system can use contiguous spectrum aggregation and/or non-contiguous spectrum aggregation, and also can use either symmetric aggregation or asymmetric aggregation.

Cross-carrier scheduling may be possible among the plurality of CCs. That is, by using a DL grant (or UL grant) of a PDCCH of a DL CC #1, a PDSCH of a DL CC #2 (or a PUSCH transmitted on a UL CC #2 not linked to the DL CC #1) can be indicated. A CC on which the PDCCH is transmitted is referred to as a PDCCH carrier, a scheduling carrier, a reference carrier, or a primary carrier. A CC on which the PDSCH/PUSCH is transmitted is referred to a PDSCH/PUSCH carrier, a scheduled carrier, or a secondary carrier.

The reference carrier is a DL CC and/or a UL CC which is used preferentially between the BS and the UE (or on which essential control information is exchanged).

A linkage can be defined between the DL CC and the UL CC. The linkage implies a connection between a specific DL CC and a specific UL CC. The linkage can be represented by a mapping relation between a DL CC (or UL DD) on which data for HARQ is transmitted and a UL CC (or DL CC) on which an ACK/NACK signal is transmitted or a mapping relation between a DL CC on which a PDCCH is transmitted and a UL CC on which a PUSCH scheduled using a UL grant is transmitted. In case of cross-carrier scheduling, the linkage may imply a linkage between a DL CC on which scheduling information such as the PDCCH is transmitted and a DL/UL CC on which a shared channel such as PDSCH/PUSCH is transmitted.

Figure 7:
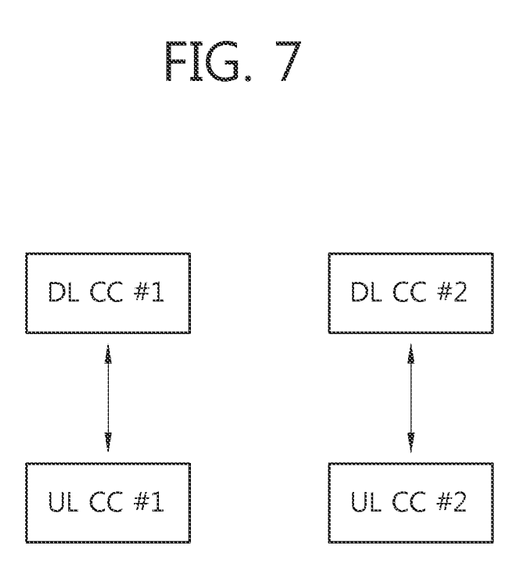
FIG. 7 shows an example of a linkage between a DL component carrier (CC) and a UL CC.

FIG. 7 shows an example of a linkage between a DL CC and a UL CC. A DL CC #1 is linked to a UL CC #1, and a DL CC #2 is linked to a UL CC #2.

If the DL CC and the UL CC are 1:1 mapped, HARQ can be performed by using the conventional PUCCH structure. By acquiring $n_{CCE,1}$ from a PDCCH of the DL CC #1, a resource index $n^{(1)}_{PUUCH,1} = n_{CCE,1} + N^{(1)}_{PUUCH,1}$ of the UL CC #1 can be acquired. Likewise, by acquiring $n_{CCE,2}$ from a PDCCH of the DL CC #2, a resource index $n^{(1)}_{PUUCH,2} = n_{CCE,2} + N^{(1)}_{PUUCH,2}$ of the UL CC #2 can be acquired.

However, if the DL CC and the UL CC are 1:K or K:1 mapped (where K>1) instead of 1:1 mapping, ACK/NACK resources may overlap with each other in the same UL CC. For example, assume that the DL CC #1 and the DL CC #2 are linked to the UL CC#1. If $N^{(1)}_{PUUCH,1} = N^{(1)}_{PUUCH,2}$, and $n_{CCE,1}$ of the PDCCH of the DL CC #1 is equal to $n_{CCE,1}$ of the PDCCH of the DL CC #1, then $n^{(1)}_{PUUCH,1} = n^{(1)}_{PUUCH,2}$. Thus, a problem may occur in that the same ACK/NACK resource is allocated to the ACK/NACK signal in an overlapping manner.

In addition, with the introduction of a plurality of CCs, the ACK/NACK resource for transmitting the ACK/NACK signal for each CC may be insufficient.

Therefore, the proposed method uses ACK/NACK bundling. The ACK/NACK bundling does not feed back respective ACK/NACK signals for a plurality of transport blocks but transmits only one bundled ACK/NACK signal even if a UE receives the plurality of transport blocks through a plurality of CCs.

If reception failure occurs in any one of the plurality of transport blocks, the bundled ACK/NACK signal may be a NACK signal. Otherwise, if all of the transport blocks are successfully received, the bundled ACK/NACK signal may be an ACK signal.

Figure 8:
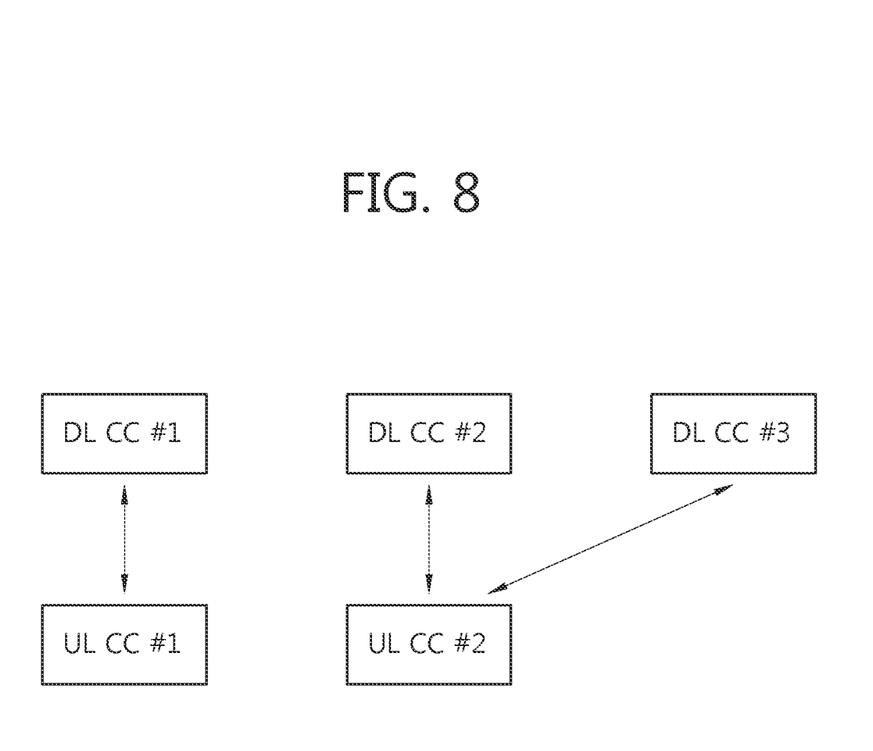
FIG. 8 shows an example of a linkage between a DL CC and a UL CC.

FIG. 8 shows an example of a linkage between a DL CC and a UL CC. A DL CC #1 is linked to a UL CC #1, and a DL CC #2 and a DL CC #3 are linked to a UL CC #2.

A UE can acquire a resource index $n^{(1)}_{PUUCH,1}$ of the UL CC #1 from a PDCCH of the DL CC #1. An ACK/NACK signal for a transport block received on a PDSCH in the DL CC #1 can be transmitted in the UL CC #1 on a PUCCH configured by using $n^{(1)}_{PUUCH,1}$.

In addition, the UE can acquire a first resource index $n^{(1)}_{PUUCH,2}$ of the UL CC #2 from a PDCCH of the DL CC #2. The UE can acquire a second resource index $n^{(1)}_{PUUCH,3}$ of the UL CC #2 from a PDCCH of the DL CC #3.

If the first resource index $n^{(1)}_{PUUCH,2}$ and the second resource index $n^{(1)}_{PUUCH,3}$ are different from each other, different PUCCHs can be configured. In this case, it is said that PUCCHs are different when at least one of an orthogonal sequence index, a cyclic shift index, and a resource block index which are used to configure the PUCCHs is different. Assume that a first PUCCH is configured by using the first resource index $n^{(1)}_{PUUCH,2}$, and a second PUCCH is configured by using the second resource index $n^{(1)}_{PUUCH,3}$. The UE can transmit an ACK/NACK signal for a transport block of the DL CC #2 on the first PUCCH in the UL CC #2, and can transmit an ACK/NACK signal for a transport block of the DL CC #3 on the second PUCCH.

If the first resource index $n^{(1)}_{PUUCH,2}$ is identical to the second resource index $n^{(1)}_{PUUCH,3}$ a bundled ACK/NACK signal is configured. For example, if both of a transport block of the DL CC #2 and a transport block of the DL CC #3 are successfully decoded, the bundled ACK/NACK signal is ACK, and if any one of the transport blocks fails in decoding, the bundled ACK/NACK signal is NACK. The UE transmits the bundled ACK/NACK signal in the UL CC #2 on the PUCCH configured by using the first resource index $n^{(1)}_{PUUCH,2}$ (or the second resource index $n^{(1)}_{PUUCH,3}$).

When different ACK/NACK resources are allocated for a plurality of transport blocks, the UE transmits an ACK/NACK signal by using respective ACK/NACK resources of the plurality of transport blocks. When the same ACK/NACK resource is allocated to the plurality of transport blocks, the UE transmits a bundled ACK/NACK signal for the plurality of transport blocks by using one ACK/NACK resource.

Since whether to transmit the bundled ACK/NACK signal is determined according to whether the allocated ACK/NACK resource overlaps, additional signaling is not required, and shortage of ACK/NACK resources can be avoided.

Figure 9:
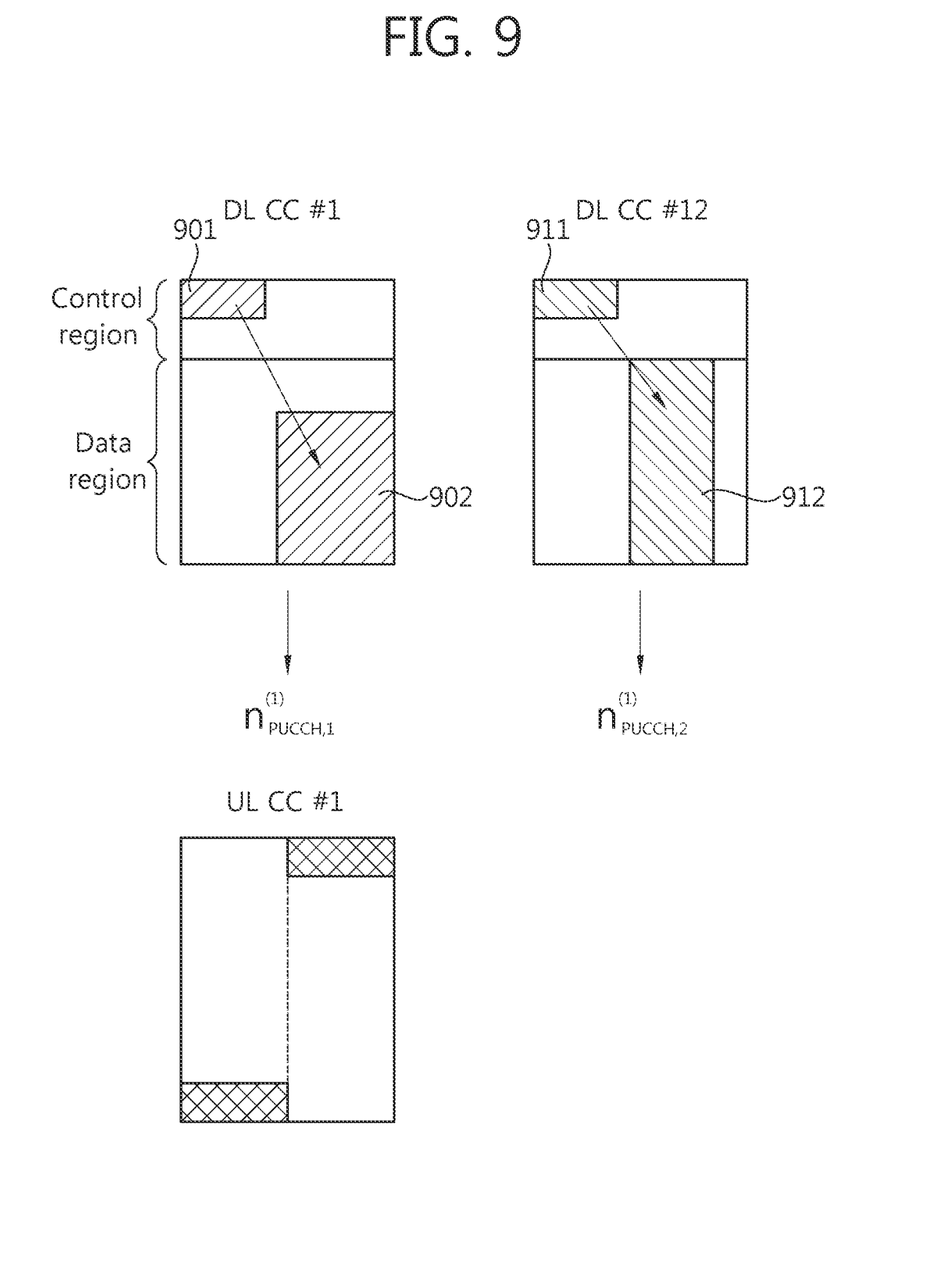
FIG. 9 shows an example of transmitting a positive-acknowledgement (ACK)/negative-acknowledgement (NACK) signal.

FIG. 9 shows an example of transmitting an ACK/NACK signal.

Assume that an ACK/NACK signal for a DL CC #1 and an ACK/NACK signal for a DL CC #2 are transmitted through a UL CC #1. A linkage between a UL CC and a DL CC for HARQ can be predetermined. Alternatively, a BS can report a UL CC for a ACK/NACK signal to a UE by using a PDCCH or an RRC message.

In the DL CC #1, a first transport block is received on a PDSCH 902 indicated by resource allocation on a PDCCH 901. In the DL CC #2, a second transport block is received on a PDSCH 912 indicated by resource allocation on a PDCCH 911.

The UE can acquire a first ACK/NACK resource of the first transport block and a second ACK/NACK resource of the second transport block. For example, the UE can acquire a first resource index $n^{(1)}_{PUUCH,1}$ for the first transport block and a second resource index $n^{(1)}_{PUUCH,2}$ for the second transport block.

If a first ACK/NACK resource and a second ACK/NACK resource overlap (i.e., the first resource index $n^{(1)}_{PUUCH,1}$ is identical to the second resource index $n^{(1)}_{PUUCH,2}$), the UE configures a bundled ACK/NACK signal for the first transport block and the second transport block.

Various methods can be used to allow the first ACK/NACK resource and the second ACK/NACK resources to overlap.

In a first embodiment, when each DL CC has the same parameter $N^{(1)}_{PUUCH}$ or the parameter is set to one value, the BS can allow the ACK/NACK resources to overlap by allowing PDCCHs of respective transport blocks to have the same $n_{CCE}$.

In order to allow each DL CC to have the same $n_{CCE}$, a length of a CCE stream in a control region of each DL CC can be set to the same value. This can be achieved by allowing each DL CC to have the same CFI, by allowing the number of PHICH groups to be set to the same value, or by allowing an amount of a resource for a reference signal to be set to the same value in the control region of the DL CC.

Alternatively, PDCCHs for ACK/NACK bundling can be preferentially allocated so that they have the same $n_{CCE}$ in the control region.

In a second embodiment, even if a PDCCH of each transport block does not have the same $n_{CCE}$, the BS can configure the parameter $N^{(1)}_{PUUCH}$ of each DL CC to have the same resource index.

The UE can report reception information for a transport block, which is successfully or unsuccessfully received, to the BS together with the bundled ACK/NACK signal. The reception information can indicate the number of transport blocks (and/or an index of a corresponding transport block) which are successfully received by the UE and/or the number of transport blocks (and/or an index of a corresponding transport block) which are unsuccessfully received. The reception information can indicate a DL CC index of a transport block which is successfully or unsuccessfully received.

ACK/NACK bundling can be activated or inactivated. After activating the ACK/NACK bundling, the UE can configure a bundled ACK/NACK for a DL/CC allocated with an overlapping ACK/NACK resource. The BS can transmit an indicator for indicating activation/inactivation of the ACK/NACK bundling to the UE by using a PDCCH or an RRC message.

The ACK/NACK bundling can be used according to a DL/UL linkage. That is, in case of a linkage in which a DL:UL is set to k:1 (where k>1) when two or more DL CCs are linked to one UL CC, the bundled ACK/NACK is transmitted through a UL CC linked to a DL CC. This has an advantage in that additional signaling is not necessary for the UL CC on which the bundled ACK/NACK is transmitted.

The ACK/NACK bundling can be used irrespective of the DL/UL linkage. This requires signaling regarding a specific UL CC used to transmit the bundled ACK/NACK. Information on the CC used to transmit the bundled ACK/NACK may be transmitted by using a PDCCH or an RRC message. Alternatively, if the CC used to transmit the ACK/NACK signal is additionally defined (which is called as a UL reference CC), the bundled ACK/NACK signal can be transmitted through the UL reference CC.

By transmitting the bundled ACK/NACK signal for a PDSCH mapped to the same PUCCH, a PUCCH resource can be effectively used. In addition, in contiguous spectrum aggregation, if the bundled ACK/NACK signal is used for contiguous CCs, restriction on UL power for PUCCH transmission may decrease.

ACK/NACK bundling can be used irrespective of whether the ACK/NACK resources overlap. When the bundled ACK/NACK signal can be configured irrespective of overlapping of the ACK/NACK resources, it is called a first bundle mode, and when the bundled ACK/NACK signal can be configured for a DL CC in which the ACK/NACK resources overlap, it is called a second bundle mode. In the second bundle mode, the bundled ACK/NACK signal is configured for one or more DL CCs allocated with overlapping ACK/NACK resources among DL CCs capable of ACK/NACK bundling. Signaling for switching between the first bundle mode and the second bundle mode can be exchanged between the BS and the UE. Alternatively, the UE can operate in the first bundle mode in the absence of the overlapping ACK/NACK resource, and can operate in the second bundle mode in the presence of the overlapping ACK/NACK resource.

Although bundling of an ACK/NACK signal for HARQ is described in the aforementioned example, the technical features of the present invention can also apply to channel quality indicator (CQI) bundling. The CQI bundling is when one blinded CQI for a plurality of DL CC is transmitted on a PUSCH or PUCCH through one UL CC. The bundled CQI is a value obtained by averaging respective CQIs of the plurality of DL CCs or one value representing the respective CQIs.

Figure 10:
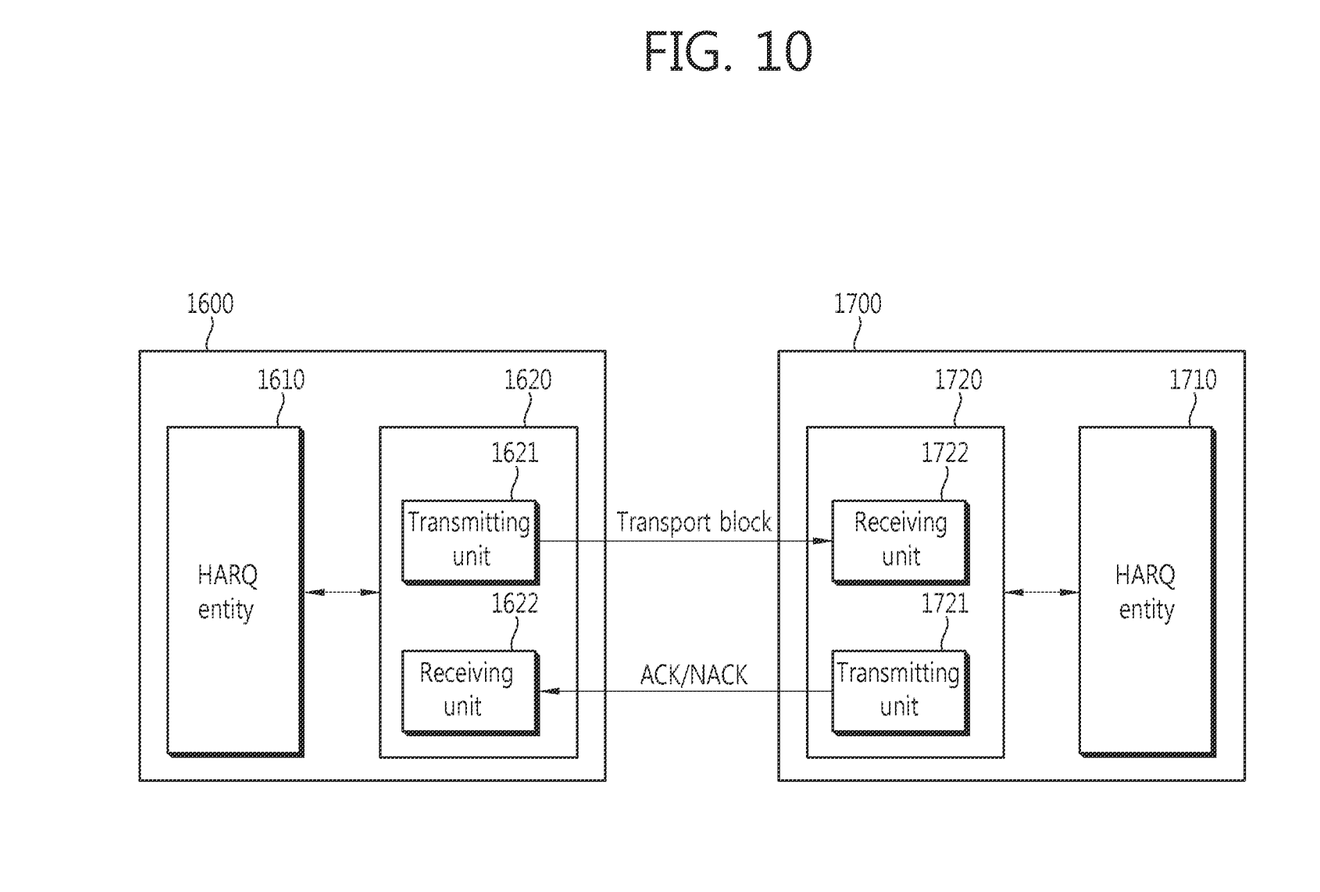
FIG. 10 is a block diagram showing a transmitter and a receiver according to an embodiment of the present invention.

FIG. 10 is a block diagram showing a transmitter and a receiver according to an embodiment of the present invention. In HARQ, the transmitter transmits or retransmits a transport block, and the receiver transmits an ACK/NACK signal. In DL HARQ, the transmitter may be a part of a BS, and the receiver may be a part of a UE. In UL HARQ, the transmitter may be a part of the UE, and the receiver may be a part of the BS.

A transmitter 1600 supports multiple carriers, and includes an HARQ entity 1610 and a physical entity 1620. The physical entity 1620 includes a transmitting unit 1621 and a receiving unit 1622.

The HARQ entity 1610 generates a transport block or a retransmission block, and manages an HARQ process. The transmitting unit 1621 transmits one or more transport blocks. The receiving unit 1622 receives an ACK/NACK signal as a reception acknowledgement for the transport block. In response to the reception acknowledgement, the HARQ entity 1610 can retransmit the transport block.

For ACK/NACK bundling, the transmitting unit 1621 can allocate overlapping ACK/NACK resources to a plurality of transport blocks.

A receiver 1700 supports multiple carriers, and includes an HARQ entity 1710 and a physical entity 1720. The physical entity 1720 includes a transmitting unit 1721 and a receiving unit 1722.

The HARQ entity 1710 confirms an error of a received transport block, and manages an HARQ process. The receiving unit 1722 receives the transport block. The transmitting unit 1721 transmits an ACK/NACK signal as a reception acknowledgement for the transport block. If ACK/NACK resources overlap, the transmitting unit 1721 can transmit a bundled ACK/NACK signal by using the overlapping ACK/NACK resources. On the basis of the reception acknowledgement, the receiving unit 1722 can receive a retransmitted transport block.

The HARQ entities 1610 and 1710 and the physical entities 1620 and 1720 can be implemented in hardware, or may conform to a protocol implemented by a processor (not shown).

Figure 11:
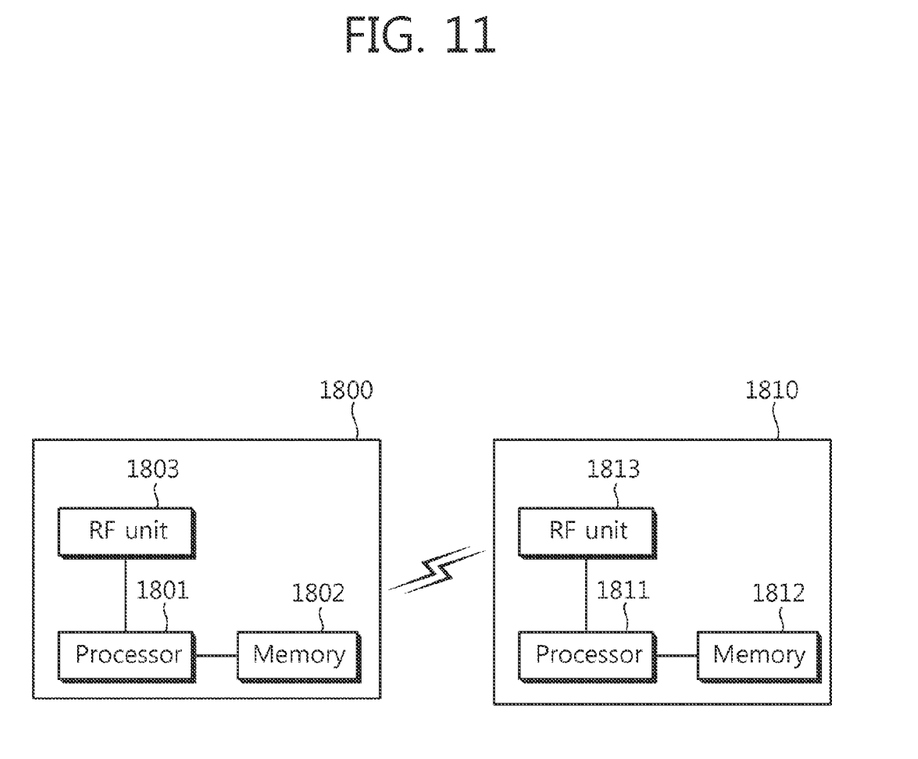
FIG. 11 is a block diagram showing a wireless communication system according to an embodiment of the present invention.

FIG. 11 is a block diagram showing a wireless communication system according to an embodiment of the present invention.

A BS 1800 includes a processor 1801, a memory 1802, and a radio frequency (RF) unit 1803.

The processor 1801 implements the proposed functions, procedures, and/or methods. An HARQ operation of the BS can be implemented by the processor 1801 in the aforementioned embodiment. The processor 1801 transmits a plurality of transport blocks through a plurality of DL CCs. The transport block can be transmitted on a PDSCH indicated by resource allocation on a PDCCH. The processor 1801 can configure the PDCCH so that ACK/NACK resources overlap in order to indicate ACK/NACK bundling.

The memory 1802 is coupled to the processor 1801, and stores a protocol or parameter for the HARQ operation. The RF unit 1803 is coupled to the processor 1801, and transmits and/or receives a radio signal.

A UE 1810 includes a processor 1811, a memory 1812, and an RF unit 1813.

The processor 1811 implements the proposed functions, procedures, and/or methods. An HARQ operation of the UE can be implemented by the processor 1811 in the aforementioned embodiment. The processor 1811 can configure a bundle ACK/NACK signal when ACK/NACK resources overlap, and can transmit the bundle ACK/NACK signal through a UL CC by using the overlapping ACK/NACK resources.

The memory 1812 is coupled to the processor 1811, and stores a protocol or parameter for the HARQ operation. The RF unit 1813 is coupled to the processor 1811, and transmits and/or receives a radio signal.

The processor 1801, 1811 may include Application-Specific Integrated Circuits (ASICs), other chipsets, logic circuits, and/or data processors. The memory 1802, 1812 may include Read-Only Memory (ROM), Random Access Memory (RAM), flash memory, memory cards, storage media and/or other storage devices. The RF unit 1803, 1813 may include a baseband circuit for processing a radio signal. When the above-described embodiment is implemented in software, the above-described scheme may be implemented using a module (process or function) which performs the above function. The module may be stored in the memory 1802, 1812 and executed by the processor 1801, 1811. The memory 1802, 1812 may be placed inside or outside the processor 1801, 1811 and connected to the processor 1801, 1811 using a variety of well-known means.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

The above-described embodiments include various aspects of examples. Although all possible combinations for describing the various aspects may not be described, those skilled in the art may appreciate that other combinations are possible. Accordingly, the present invention should be construed to include all other replacements, modifications, and changes which fall within the scope of the claims.

The invention claimed is:

1. A method for performing a hybrid automatic repeat request (HARD) in a multi-carrier system, performed by a user equipment, the method comprising:

receiving a plurality of transport blocks through a plurality of downlink component carriers;

determining a plurality of positive-acknowledgement (ACK)/negative-acknowledgement (NACK) resources for the plurality of transport blocks; and if the plurality of ACK/NACK resources overlap, transmitting one bundled ACK/NACK signal for the plurality of transport blocks through an uplink component carrier by using the overlapping ACK/NACK resources, wherein the plurality of transport blocks is received on a physical downlink shared channel (PDSCH) through the plurality of downlink component carriers, and each PDSCH is indicated by a resource allocation on a physical downlink control channel (PDCCH), wherein the plurality of ACK/NACK resources is identified by a plurality of resource indices, and the plurality of resource indices is used for transmission of respective PDCCHs, and wherein the overlapping ACK/NACK resources are resources having a same resource index among the plurality of resource indices.

2. The method of claim 1, wherein a resource index $n^{(1)}_{PUUCH}$ is defined as $n_{CCE} + N^{(1)}_{PUUCH}$, where $n_{CCE}$ is an index of a first control channel element (CCE) of a corresponding PDCCH and $N^{(1)}_{PUUCH}$ is a parameter value reported by a base station to the user equipment via a higher layer message.

3. The method of claim 2, wherein the same $n_{CCE}$ is used in transmission of respective PDCCHs and thus the plurality of resource indices are the same.

4. The method of claim 2, wherein the same parameter value $N^{(1)}_{PUUCH}$ is used for the plurality of downlink component carriers and thus the plurality of resource indices are the same.

5. The method of claim 1, wherein each of the plurality of ACK/NACK resources is defined by an orthogonal sequence index, a cyclic shift index, and a resource block index.

6. The method of claim 1, wherein the bundled ACK/NACK signal is an ACK signal if the plurality of transport blocks are all successfully received, and is a NACK signal if one or more of the plurality of transport blocks are unsuccessfully received.

7. A receiver for performing a hybrid automatic repeat request (HARD), comprising:

a receiving unit configured to receive a plurality of transport blocks through a plurality of downlink component carriers; and a transmitting unit configured to transmit one bundled ACK/NACK signal for the plurality of transport blocks through an uplink component carrier by using overlapping ACK/NACK resources if the plurality of ACK/NACK resources for the plurality of transport blocks overlap, wherein the plurality of transport blocks is received on a physical downlink shared channel (PDSCH) through the plurality of downlink component carriers, and each PDSCH is indicated by a resource allocation on a physical downlink control channel (PDCCH), wherein the plurality of ACK/NACK resources is identified by a plurality of resource indices, and the plurality of resource indices is used for transmission of respective PDCCHs, and wherein the overlapping ACK/NACK resources are resources having same resource index among the plurality of resource indices.

8. The receiver of claim 7, wherein the bundled ACK/NACK signal is an ACK signal if the plurality of transport blocks are all successfully received, and is a NACK signal if one or more of the plurality of transport blocks are unsuccessfully received.

9. The receiver of claim 7, wherein a resource index $n^{(1)}_{PUUCH}$ is defined as $n_{CCE}+N^{(1)}_{PUUCH}$, where $n_{CCE}$ is an index of a first control channel element (CCE) of a corresponding PDCCH and $N^{(1)}_{PUUCH}$ is a parameter value reported by a base station to the user equipment via a higher layer message.

10. The receiver of claim 9, wherein the same $n_{CCE}$ is used in transmission of respective PDCCHs and thus the plurality of resource indices are the same.

11. The receiver of claim 9, wherein the same parameter value $N^{(1)}_{PUUCH}$ is used for the plurality of downlink component carriers and thus the plurality of resource indices are the same.

12. The receiver of claim 7, wherein each of the plurality of ACK/NACK resources is defined by an orthogonal sequence index, a cyclic shift index, and a resource block index.

* * * * *